United States Patent
Ferstl et al.

(10) Patent No.: US 9,766,024 B2
(45) Date of Patent: Sep. 19, 2017

(54) METHOD FOR CONTROLLING A TEMPERATURE DISTRIBUTION IN A HEAT EXCHANGER

(71) Applicant: LINDE AKTIENGESELLSCHAFT, München (DE)

(72) Inventors: Johann Ferstl, München (DE); Anton Moll, Raisting (DE); Manfred Steinbauer, Raisting (DE); Ulrich von Gemmingen, München (DE); Rainer Flüggen, Bichl (DE)

(73) Assignee: Linde Aktiengesellschaft, Munich (DE)

( * ) Notice: Subject to any disclaimer, the term of this patent is extended or adjusted under 35 U.S.C. 154(b) by 189 days.

(21) Appl. No.: 14/434,512

(22) PCT Filed: Oct. 2, 2013

(86) PCT No.: PCT/EP2013/002976
§ 371 (c)(1),
(2) Date: Apr. 9, 2015

(87) PCT Pub. No.: WO2014/056588
PCT Pub. Date: Apr. 17, 2014

(65) Prior Publication Data
US 2015/0369548 A1  Dec. 24, 2015

(30) Foreign Application Priority Data

Oct. 9, 2012 (EP) .................................. 12006983

(51) Int. Cl.
*G05D 23/00* (2006.01)
*F28F 27/02* (2006.01)
(Continued)

(52) U.S. Cl.
CPC ............... *F28F 27/02* (2013.01); *F25J 5/002* (2013.01); *F28D 7/024* (2013.01); *F28D 7/16* (2013.01);
(Continued)

(58) Field of Classification Search
CPC .......... F28D 7/024; F28D 7/16; F28D 9/0068; F28F 27/02; F28F 27/00; F25J 5/002; F25J 2210/06
(Continued)

(56) References Cited

U.S. PATENT DOCUMENTS 6,357,516 B1 * 3/2002 Judge .................... F28F 3/083
165/166
2010/0012310 A1  1/2010 Christensen et al.
(Continued)

FOREIGN PATENT DOCUMENTS

| DE | 2835334 A1 | 2/1980 |
| DE | 102007021564 A1 | 11/2008 |
| DE | 102007021565 A1 | 11/2008 |

*Primary Examiner* — Davis Hwu
(74) *Attorney, Agent, or Firm* — David A. Hey

(57) ABSTRACT

The invention relates to a method for controlling a temperature distribution in a heat exchanger, in which an actual temperature distribution in the heat exchanger is measured by means of at least one optical waveguide arranged in the heat exchanger, in particular in the form of a glass fiber, light being launched into the optical waveguide and light that is scattered in the optical waveguide being evaluated for determining the actual temperature distribution, and at least one flow of a fluid medium that is carried in the heat exchanger being controlled in such a way that the actual temperature distribution is made to approximate a predefined target temperature distribution. The invention also relates to a device for carrying out a method for controlling a temperature distribution in a heat exchanger.

12 Claims, 3 Drawing Sheets

(51) Int. Cl.
  *F28F 27/00*  (2006.01)
  *F28D 7/02*   (2006.01)
  *F28D 7/16*   (2006.01)
  *F28D 9/00*   (2006.01)
  *G01K 11/32*  (2006.01)
  *F25J 5/00*   (2006.01)

(52) U.S. Cl.
  CPC ............ *F28D 9/0068* (2013.01); *F28F 27/00* (2013.01); *G01K 11/32* (2013.01); *F25J 2210/06* (2013.01); *F25J 2280/02* (2013.01); *F25J 2290/50* (2013.01); *F25J 2290/90* (2013.01)

(58) Field of Classification Search
  USPC ........................................................ 165/296
  See application file for complete search history.

(56) References Cited

U.S. PATENT DOCUMENTS

| | | | |
|---|---|---|---|
| 2010/0037889 A1* | 2/2010 | Gordon | F24D 11/003 126/615 |
| 2011/0232377 A1* | 9/2011 | Sierra | E21B 47/1005 73/152.18 |
| 2012/0261089 A1 | 10/2012 | Steinbauer et al. | |

\* cited by examiner

METHOD FOR CONTROLLING A TEMPERATURE DISTRIBUTION IN A HEAT EXCHANGER

The invention relates to a method for controlling a temperature distribution in a heat exchanger.

Such heat exchangers are known from the prior art and serve for the indirect heat exchange between at least two fluid media. In the case of a heat exchanger in the form of a helically coiled heat exchanger, a plurality of tubes, which form a tube bundle, are coiled helically around a core tube, a pressure-bearing shell enclosing that tube bundle that defines a shell space, surrounding the tube bundle, for receiving the one medium, while the other medium is carried in the said tube bundle, so that the two media can enter into the said indirect heat exchange. The core tube extends in particular along a longitudinal axis, which—with respect to a state of the heat exchanger or the shell arranged as intended—coincides with the vertical. Such a helically coiled heat exchanger is known for example from WO 2007/014 617 and WO 2007/009 640.

Furthermore, a heat exchanger may also be formed as a straight tube heat exchanger. In this case, the said tubes of the tube bundle extend linearly or in a U shape along the longitudinal axis of the shell of the heat exchanger, which is preferably oriented horizontally, and are anchored in tube sheets of the heat exchanger.

Furthermore, such a heat exchanger may also be a plate heat exchanger, which has a plurality of plates arranged parallel to one another, a fin being respectively arranged between two neighbouring plates, so that a multiplicity of parallel channels that can be flowed through by a medium are formed between neighbouring plates. To the sides, the fins are bounded by what are known as sidebars (also referred to as edge strips), which are brazed to the adjacent plates (and the fins). In this way a plurality of parallel heat exchanging passages of the plate heat exchanger are formed, so that for example various media can be made to pass one another in countercurrent in the heat exchanging passages, in order to perform an indirect heat exchange.

Furthermore, there are known heat exchangers in the form of regenerators, in which the media that are intended to enter into heat exchange are introduced into the heat exchanger one after the other, i.e. here for example an amount of heat given off to the heat exchanger by a first medium is transferred to the subsequent second medium.

With regard to the aforementioned apparatuses, one concern in particular is to be able to operate them in an optimized manner in terms of energy. For example, in the case of a helically coiled heat exchanger, it would be desirable to achieve a distribution of the liquid phase or the medium over the said tube bundle that is as uniform as possible in the shell space, in order to be able to operate the heat exchanger as efficiently as possible. There is also a similar issue with straight tube or plate heat exchangers, with which it is likewise the case that possible pinch points (smallest temperature difference between two media carried in the heat exchanger) and unequal loads should be avoided and the heating surface used optimally.

The present invention correspondingly addresses the problem of providing a method for controlling the temperature in a heat exchanger that makes it possible for the respective apparatus to be operated in an optimized manner in terms of energy.

This problem is solved by a method for controlling a temperature distribution in a heat exchanger with the features described herein.

This provides that in the case of the method according to the invention, an actual temperature distribution in the heat exchanger is measured by means of at least one optical waveguide arranged in the heat exchanger, in particular in the form of a glass fibre or some other optical fibre, light being radiated into the at least one optical waveguide and light that is scattered in the at least one optical waveguide being evaluated for determining the actual temperature distribution, and at least one flow of a fluid medium that is carried in the heat exchanger being controlled in such a way that the actual temperature distribution is made to approximate a predefined target temperature distribution.

For the evaluation of the scattered light, preferably connected to the at least one optical waveguide is a measuring device, which is set up and intended for measuring the actual temperature distribution in the heat exchanger by means of the said optical waveguide.

For this purpose, the said measuring device is preferably designed or used for introducing light or optical signals into the at least one optical waveguide and evaluating in a known way light scattered back into the waveguide. This makes use of the fact that the optical signals launched into the optical waveguide and scattered back are highly temperature-dependent, and are therefore suitable for measuring the temperature in the area around the optical waveguide. A number of procedures that allow the temperature to be determined at any desired point of the waveguide with sufficiently high precision exist for the evaluation of such optical signals of the waveguide.

In a preferred embodiment of the method according to the invention, the measuring device is set up and intended for evaluating light scattered back through the at least one optical waveguide that is produced by Raman scattering of the light introduced into the waveguide. This makes use of the fact that optical waveguides are generally produced from doped quartz glass (amorphous solid-state structure, consisting primarily of silicon dioxide). In such amorphous solid-state structures, lattice vibrations are induced by thermal effects. Such lattice vibrations are temperature-dependent. Light that impinges on the molecules or particles in the waveguide therefore enters into interaction with the electrons of the molecules. This interaction is also referred to as Raman scattering. The backscattered light can be divided into three spectral groups. Apart from the Rayleigh scattering, which corresponds to the wavelength of the light radiated in, there are what are known as the Stokes components and the anti-Stokes components. By contrast with the Stokes components, which are shifted towards higher wavelengths and are only slightly temperature-dependent, the anti-Stokes components, which are shifted towards smaller wavelengths, are highly temperature-dependent. The measuring device is therefore preferably designed for calculating the intensity ratio between Stokes and anti-Stokes components, the measuring device preferably being designed for calculating for this purpose a Fourier transform of these two backscattered components and comparing it with a Fourier transform of a reference signal. This gives the intensities of the two components over the length of the optical waveguide. Consequently, the temperature for each point of the optical waveguide can be determined by comparing the two intensities.

According to a further variant of the method according to the invention, it is provided that the temperature determination takes place by evaluation of the Rayleigh scattering. For this purpose, the measuring device preferably has a coherent frequency domain reflectometer (also referred to as a c-OFDR for coherent Optical Frequency Domain Reflectometer), in which light of a tunable laser is launched into a Mach-Zehnder interferometer, which divides the light over two paths, the optical waveguide forming one path and the other path being a reference path of a known length. The Rayleigh scattered light from the optical waveguide is superimposed with the light component from the reference path and detected. When tuning the laser wavelength, a periodic signal is thereby produced at the detector, the frequency of which depends on the respective scattering location of the optical waveguide. The individual frequencies of this signal, which can be obtained by way of a Fourier transform, consequently correspond to the scattering locations in the optical waveguide; the amplitude of their frequency content indicates the intensity of the respective reflection. Resolutions of ≤0.1 mm can be achieved here.

The Rayleigh scattering in an optical waveguide, such as for example a glass fibre, is produced by elastic scattering processes at local effects/disturbances of the optical waveguide. If such a glass fibre is scanned by means of c-OFDR, a fluctuating intensity profile of the Rayleigh scattering along the glass fibre that is characteristic of the glass fibre is obtained, the profile being spatially stretched or compressed when there is a change in temperature (change in the spatial extent of the fibre), whereby the temperature along the glass fibre can be calculated. The measuring device is correspondingly preferably configured to divide up the signal along the glass fibre into neighbouring segments (e.g. ≥1 mm) and to transform the corresponding signal into the frequency domain. For each segment a fluctuating reflection pattern is thereby obtained in dependence on the frequency. Changes of the temperature or strain of the glass fibre cause a frequency shift, which is in particular proportional to the change in temperature of the glass fibre in the respective segment. The measuring device is correspondingly preferably designed for determining the (local) temperature of the glass fibre or the optical waveguide on the basis of the respective frequency shift.

In a further embodiment of the method according to the invention, the temperature measurement takes place by way of the evaluation of optical signals, such as are produced by Brillouin scattering of the optical waveguide. In this case, the temperature measurement is based on the spatially resolved determination of the reference frequency between the primary lightwave introduced into the optical waveguide and the wave induced as a result of Brillouin scattering in the waveguide and scattered back, which is reduced in its frequency in comparison with the primary wave in dependence on the temperature. The measuring device is therefore preferably designed for introducing a pulsed primary lightwave into the waveguide and detecting the backscattered light in a time-resolved manner for different frequency differences and, with knowledge of the pulsed transit time, determining in a spatially resolved manner the frequency shift on the basis of the change in temperature. Therefore, also in this configuration of the invention, the temperature at any desired point of the optical waveguide can be determined by the evaluation of the backscattered optical signals.

In a further embodiment of the invention, it is envisaged to measure the temperature by way of the evaluation of optical signals, such as are produced by scattering at the Bragg grating. Bragg gratings are optical band filters recorded in the optical waveguide, which can be placed almost any desired number of times in the optical waveguide. The centre wavenumber of the band-stop filter is dictated here by the Bragg condition. The spectral width of the band-stop filter depends not only on the length of the grating and the refractive index but also on the temperature. The measuring device is then correspondingly designed for determining for a given grating length, varying over the optical waveguide, and a given refractive index the temperature at the respective location of the Bragg grating by way of the width of the band-stop filter.

On account of the high resolution of the temperature measuring method according to the invention, the actual temperature distribution can preferably be measured as a three-dimensional actual temperature distribution or as a three-dimensional actual temperature profile. This means in particular that the temperature can be specified exactly for a plurality of measuring locations distributed three-dimensionally in space. For this purpose, the at least one optical waveguide or a plurality of such optical waveguides is/are laid along the desired measuring locations, so that the at least one optical waveguide or a number of such optical waveguides extend(s) from measuring location to measuring location. The measuring locations in the optical waveguide in this case lie very close together, since the aforementioned methods of evaluation have a comparatively high spatial resolution.

In a variant of the method according to the invention, it is provided that the heat exchanger has a tube bundle with a multiplicity of tubes which are arranged in a pressure-bearing shell space of the heat exchanger, the said actual temperature distribution preferably being determined by means of at least one optical waveguide that is arranged in the interior space of a tube of the heat exchanger or by means of an optical waveguide that is alternatively or additionally arranged on an outer side of a tube of the heat exchanger in the shell space of the heat exchanger, the said heat exchanger preferably being formed as a helically coiled heat exchanger or a straight tube heat exchanger (see above). Here it is possible of course to provide each of the tubes of the tube bundle of the heat exchanger with an optical waveguide running in the respective tube and/or on the respective tube, the optical waveguides then preferably being brought together and coupled into the measuring device described above.

The said tubes of the tube bundle of the heat exchanger preferably form a plurality of sections of the tube bundle that are separately chargeable with the said medium, the individual sections in each case being charged with a flow of the medium in such a way that the actual temperature distribution is made to approximate the target temperature distribution. The said sections are preferably radial sections, i.e. the tubes of the tube bundle are coiled around the assigned core tube in such a way as to form at least a first section of the tube bundle, running around the core tube, and a second section of the tube bundle, separate from the first and running around the core tube, the second section surrounding the first section or at least partially passing through it, the two sections each having at least one assigned inlet, so that the two sections can be separately charged with that medium (known as tube-side control). The tube bundle can of course in this way be divided into any desired number of individual, separately chargeable sections, which lie one over the other in the radial direction of the tube bundle or at least partially passing through one another.

By means of a control means, the feeding of the said medium via the inlet of the first section is then preferably controlled separately from the feeding of the medium via the inlet of the second section. Here, the control means preferably comprises at least one valve for the inlet of the first section and a valve for the inlet of the second section. The same applies correspondingly when there is any desired number of sections of the tube bundle. Furthermore, the said sections each have at least one assigned outlet for letting out the medium from the respective section of the tube bundle.

According to a further variant of the method according to the invention, it is provided that, in the case of a heat exchanger in the form of a helically coiled heat exchanger, in the shell space a flow of a liquid medium is distributed over the said tube bundle in such a way that the actual temperature distribution is made to approximate the target temperature distribution (known as shell-side control).

In the case of the method according to the invention, such a variable liquid distribution in the shell space is preferably carried out with a liquid distributor arranged above the tube bundle for distributing the said flow in the shell space. Preferably provided here is a control means that is designed for controlling the distribution of the said flow of the liquid in the shell space. As an alternative or in addition, the control means may be set up and intended for controlling the distribution in the shell space of an additional further flow of the liquid carried in the shell space.

The said flow and/or that further flow of the liquid medium is preferably distributed here variably in a radial direction of the shell or the tube bundle at least over a first and a second section of the tube bundle and/or in a circumferential direction of the shell or tube bundle, so that the measured actual temperature distributions are adapted to correspond to a predetermined target temperature distribution.

For example, here a radially further outwardly located region or section of the tube bundle may receive more liquid within a certain time period than a further inwardly lying region or section. In the same way, liquid may be delivered to the tube bundle variably along the circumferential direction.

According to a further variant of the method according to the invention, it is provided that the heat exchanger has a plurality of plate heat exchangers, in particular interconnected or arranged in parallel, the said actual temperature distribution of the heat exchanger comprising the individual actual temperature distributions of the individual plate heat exchangers.

The at least one optical waveguide is in this case preferably arranged in a heat exchanging passage of the respective plate heat exchanger, it preferably having in this case a meandering profile within the heat exchanging passage. The layers that are provided with an optical waveguide in the exchanging passages are preferably what are known as dummy layers, which do not participate in the indirect exchanging process, i.e. are not flowed through by a medium. However, there is also the possibility of laying the optical waveguides in regular heat exchanging passages. For each plate heat exchanger there is preferably provided at least one optical waveguide for measuring an actual temperature distribution of the respective plate heat exchanger. Preferably, in each plate heat exchanger a plurality of optical waveguides is arranged in a meandering form in parallel heat exchanging passages or dummy passages.

In the case of a heat exchanger in the form of a number of plate heat exchangers, the flow to be controlled is preferably a coolant flow, which is divided upstream of the heat exchanger or the plate heat exchangers into a number of partial flows, which are in each case introduced into an assigned plate heat exchanger in order to enter there into an indirect heat exchange with at least one further flow carried in the respective plate heat exchanger. The individual partial flows are in this case preferably controlled in such a way that the actual temperature distribution measured by means of the optical waveguides is made to approximate a predefined target temperature distribution, which comprises the target temperature distribution of the individual plate heat exchangers.

The control means is preferably designed here for controlling trimming flaps or other means for variably restricting a flow of a medium, by which the individual partial flows can be restricted. Trimming flaps are, in particular, two-dimensional elements that are arranged for example in a pipeline or feedline to the respective plate heat exchanger and are rotatable about an axis in order effectively to reduce or increase the cross section of the line.

In this way, advantageously not only can the overheating zones of an individual plate heat exchanger be measured but also, by correspondingly controlling the trimming flaps in dependence on the actual temperature distribution measured (in particular in real time), each individual plate heat exchanger can be adjusted in such a way that it is possible to avoid pinch points, to eliminate unequal loading and to use the heating surface optimally. If the actual temperature distribution in individual plate heat exchangers changes due to load changes, this is detected by a change in the corresponding actual temperature distribution and can be correspondingly adjusted, so that ideally an approximation to a predefined target temperature distribution takes place.

For the case where the individual plate heat exchangers are joined together by a common header, by way of which they are charged with the said flow to be controlled, the corresponding trimming flaps or other devices can be provided in the respective header. In this respect there is of course also the possibility in principle of controlling an individual plate heat exchanger by corresponding trimming flaps in the header, so that the flow can be distributed variably over the individual heat exchanging passages.

Of course, all kinds of such heat exchangers that are interconnected in parallel can be controlled in such a way, that is to say also helically coiled heat exchangers, straight tube heat exchangers, regenerators, etc.

Furthermore, the problem addressed by the invention is solved by a device that can be used in particular in the case of the method according to the invention.

Accordingly, a device according to the invention has a heat exchanger, in particular of the aforementioned type, and also at least one optical waveguide arranged in the heat exchanger for measuring an actual temperature distribution, in particular a three-dimensional actual temperature distribution, of the heat exchanger, and a measuring device connected to the at least one optical waveguide, which device is set up and intended for launching light into the at least one optical waveguide and evaluating light scattered in the at least one optical waveguide for determining the actual temperature distribution, the device according to the invention also having a control means for controlling at least one flow carried in the heat exchanger in such a way that the actual temperature distribution is made to approximate a predefined target temperature distribution.

In a variant of the device according to the invention, it is provided that the heat exchanger has a tube bundle with a multiplicity of tubes, which are arranged in a shell space of the heat exchanger, the at least one optical waveguide being arranged in the interior space of a tube of the heat exchanger or on an outer side of the tube of the heat exchanger in the shell space, and the heat exchanger being designed in particular as a helically coiled heat exchanger or a straight tube heat exchanger (see above). Here, once again, each tube of the heat exchanger may be provided with an optical waveguide running in the tube and/or running outside on the tube, those optical waveguides then being brought together and coupled to the measuring device.

The said tubes of the heat exchanger preferably form a plurality of sections of the tube bundle that are separately chargeable with that medium, these individual sections each being charged with the said flow of the medium in such a way that the measured actual temperature distribution is made to approximate the desired target temperature distribution (known as tube-side control).

In the case of a helically coiled heat exchanger, the tubes of the tube bundle are in this case preferably coiled around a core tube of the helically coiled heat exchanger in such a way as to form at least a first section of the tube bundle, running around the core tube, and a second section of the tube bundle, separate from the first and running around the core tube, the second section surrounding the first section or at least partially passing through it, the two sections each having at least one assigned inlet, so that the two sections can be separately charged with that medium. Here, once again, any desired number of such sections may of course be provided.

The control means is then preferably designed in this respect for the purpose of controlling the feeding of the medium via the inlet of the first section separately from the feeding of the medium via the inlet of the second section. The same applies correspondingly when there is any desired plurality of sections. For this purpose, the control means comprises at least one valve for the inlet of the first section and a valve for the inlet of the second section. The same applies correspondingly when there are a plurality of sections. Furthermore, the individual sections each have at least one assigned outlet for letting out the first medium from the respective section of the tube bundle.

As an alternative or in addition to tube-side control, shell-side control may also be provided in the case of a heat exchanger in the form of a helically coiled heat exchanger.

The device according to the invention is preferably designed here for distributing a flow of a liquid medium in the shell space variably over the tube bundle in such a way that the actual temperature distribution is made to approximate the target temperature distribution. As already explained at the beginning, such control may be performed by way of a liquid distributor or an additional introduction of flows into the shell space. A variant of the device according to the invention provides in this respect a liquid distributor for distributing the said flow in the shell space that is in particular arranged above the tube bundle in the shell space. In this case, the control means is designed in particular for controlling the distribution of the said flow in the shell space and/or controlling in the shell space the distribution of an additional further flow of the liquid medium carried in the shell space. Here, the liquid distributor may have a main distributor above the tube bundle for receiving the liquid medium of the said flow that is to be distributed, the main distributor preferably having through-openings, through which the medium can be applied to the tube bundle.

In a variant of the invention, at least one additional line is provided, with at least one outlet, via which the further flow of the liquid can be applied in a controllable manner to the tube bundle, the control means, in particular for controlling the distribution of the further flow of the liquid, having at least one valve for the said line. In this connection, the main distributor may have at least one through-region, through which tubes of the tube bundle are led, it being possible for that through-region to be bounded in particular by two distributor arms of the main distributor, by way of which the liquid or the medium can be applied to the tube bundle.

Here, the said at least one line may be led through the at least one through-region. Consequently, a distribution can be performed by way of the main distributor and by way of the additional lines. A plurality of such lines are preferably provided, each with at least one outlet, by which the further flow of the liquid can be delivered in a controllable manner to the tube bundle, the outlets being distributed over the cross section of the shell space in such a way that the further flow of the liquid can be distributed variably in a radial direction of the shell at least over a first and a second section of the tube bundle (or over any desired plurality of sections) and/or in a circumferential direction of the shell, in order in particular to adapt the repeatedly measured actual temperature distribution to a predefined target temperature distribution.

In a variant of the device according to the invention, it is provided that the main distributor of the liquid distributor has a plurality of distributor arms, which are in particular made to extend respectively in the radial direction of the shell or of the core tube or else of the tube bundle.

At the same time it is also preferably provided that the distributor arms for the variable distribution of the flow of the liquid in the radial direction are divided at least into two separate segments, which each have at least one through-opening, through which liquid can be applied to the tube bundle, the control means preferably being set up and intended for separately controlling a feed of liquid into the two segments, so that the liquid can be variably distributed correspondingly in the radial direction of the shell over at least a first and a second section of the tube bundle. The same applies correspondingly when there are any desired plurality of sections.

It may also be provided that at least one distributor arm is set up and intended for applying liquid to a first section along the radial direction of the shell, and that at least one other distributor arm is set up and intended for applying liquid to a second section of the tube bundle, different from the first, along the radial direction of the shell, the two distributor arms for distributing the liquid over the two sections each having in particular at least one through-opening, through which liquid can be applied to the tube bundle, those through-openings being positioned differently along the radial direction, and in particular a plurality of downpipes being provided for feeding the individual distributor arms with the liquid, a downpipe applying liquid to at least one, in particular to two distributor arms in each case, and in particular the downpipes being arranged in the core tube or being formed by the core tube being divided into sections.

Other devices for radially variable distribution or variable distribution in the circumferential direction of the tube bundle may also be provided.

An alternative variant of the device provides that the heat exchanger is formed by a plurality of plate heat exchangers, in particular interconnected or arranged in parallel, the said actual temperature distribution in this case comprising the actual temperature distributions of the individual plate heat exchangers.

Here, the device is preferably designed for dividing the at least one flow to be controlled, which is in particular a coolant flow, upstream of the heat exchanger or upstream of the individual plate heat exchangers into a number of partial flows, and in each case introducing them into an assigned plate heat exchanger, so that they enter there into indirect heat exchange with at least one further flow carried in the respective plate heat exchanger, the device preferably being designed for controlling those individual partial flows in such a way that the respectively measured actual temperature distribution of the plate heat exchangers is made to approximate a predefined target temperature distribution, which comprises the target temperature distribution of the individual plate heat exchangers. Such control of the flow or of the partial flows may be performed with assigned trimming flaps or corresponding devices in the header of the respective heat exchangers (see above).

Further details and advantages of the invention are to be explained by the following descriptions of the figures of exemplary embodiments on the basis of the figures.

Figure 1:
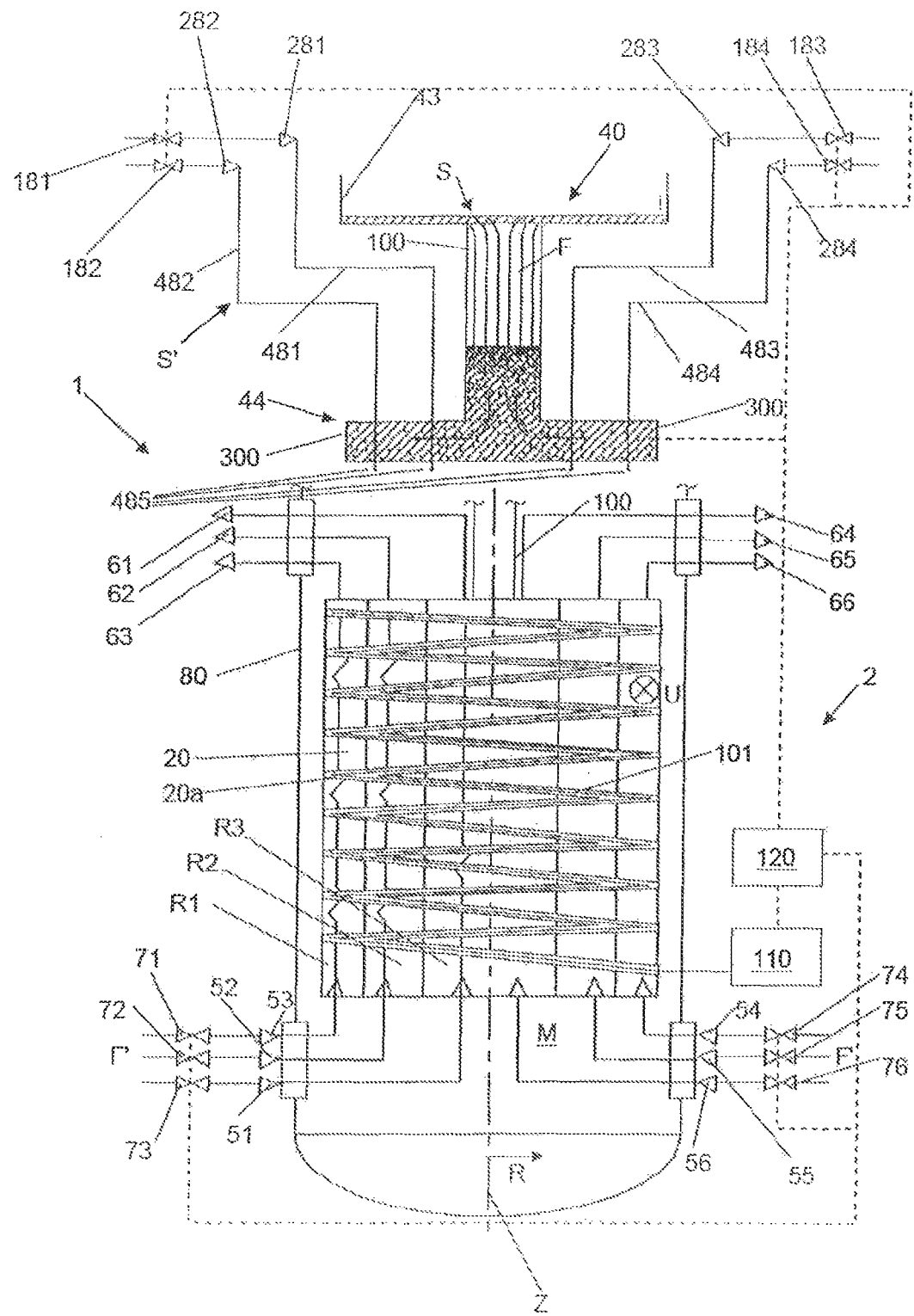
FIG. 1 shows a schematic sectional view of a helically coiled heat exchanger with tube-side and/or shell-side control in dependence on a measured actual temperature distribution of the heat exchanger.

FIG. 1 shows a schematic sectional view of a device 1 with a heat exchanger 2, which has a pressure-bearing shell 80, in particular a hollow-cylindrical pressure-bearing shell 80, the longitudinal or cylinder axis Z of which—with respect to a state of the heat exchanger 1 arranged as intended—extends along the vertical Z. The shell 80 thereby bounds a shell space M, in which a helically coiled tube bundle 20 is arranged. This bundle has a number of tubes 20a, which are coiled in a number of layers around a core tube 100, the longitudinal axis of which coincides with the longitudinal axis of the shell 80. The tube bundle 20 is therefore arranged coaxially in relation to the shell 80.

In the tube space formed by the tube bundle 20, at least a first medium F' is fed in, flowing upwards along the vertical Z. The shell space M serves for receiving a second medium in the form of a liquid F, which is delivered to the at least one tube bundle 20 and flows downwards in the shell space M along the vertical Z. On account of the formation of the tube bundle 20 as a helically coiled tube bundle 20, the first medium F' is consequently conducted in cross-countercurrent to the liquid F.

For the three-dimensional measuring of an actual temperature distribution in the shell space M or in the tube bundle 20, at least one optical waveguide 101 is provided, extending for example in one of the tubes 20a helically—in a way corresponding to the profile of the tube 20a—or arranged outside such a tube 20a, in order to measure the temperature in the heat exchanger 2 three-dimensionally. Of course, a multiplicity of such optical waveguides 101 may be arranged in the individual tubes 20a or on the individual tubes 20a or in some other way in the shell space M, in order to be able to measure specific regions of the heat exchanger 2. The at least one optical waveguide 101 is preferably led out from the shell space M and coupled to a measuring device 110, which is designed for evaluating light scattered back in the optical waveguide 101 for determining the temperature in the heat exchanger 2. Since, on account of this measuring method, a multiplicity of measuring points are obtained along the optical waveguide 101, with a three-dimensional arrangement of the at least one optical waveguide 101 a three-dimensional actual temperature distribution can be measured in real time. In order to be able to ensure optimum operation of the heat exchanger 2, a corresponding target temperature distribution of the tube bundle 20 that corresponds to such optimized operation is established. Thus, for example, an unequal distribution of the second medium or of the liquid phase F over the tube bundle 20 can be detected by a continuous measurement of the actual temperature distribution (also referred to as the actual temperature profile) of the tube bundle 20, since this results in a corresponding actual temperature distribution of the tube bundle 20. In order to be able to correct such poor distributions, the said measuring device 110 is coupled with a control means 120, which is designed for adjusting media F, F' or flows S, S' carried on the tube side or the shell side in such a way that the respectively measured actual temperature distribution is made to approximate the desired target temperature distribution.

For distributing the liquid F in the shell space M, for example, a flow S of the liquid F introduced into the shell 80 is collected in a pre-distributor 43, stabilized and degassed. The pre-distributor 43 has for receiving the liquid F a peripheral wall, which extends from a base running transversely in relation to the longitudinal axis Z of the shell 20. The base of the pre-distributor 43 is connected by way of a downpipe 380 running in the core tube 100 to a main distributor 44 of the liquid distributor 40, in order to feed the latter with the flow S of the liquid F, that main distributor 44 having for distributing the flow S of the liquid F over the entire cross section of the shell space M transversely in relation to the vertical Z a plurality of distributor arms 300 (cf. FIG. 2), which respectively extend from the core tube 100 in a radial direction R of the shell 80 in the form of sectors of a circle, so that between the distributor arms 300 there are formed through-regions 45 (cf. FIG. 2), through which the tubes 20a of the tube bundle 20 can be led past the main distributor 44.

The distributor arms 300 have in each case a base with a plurality of through-openings known as perforated plates, through which liquid F introduced into the distributor arms 300 can rain down on the tube bundle 20 arranged below along the vertical Z.

In order to be able to have an influence on the distribution of the liquid F in the shell space M and, if appropriate, to be able for example to counteract an unequal distribution, on the shell side the distributing and feeding of part of the liquid F is carried out in the form of at least one further flow S' parallel to the (main) flow S.

For this purpose, additional lines 481 to 484 are provided for conducting the further flow S' (or the further flows), led into the shell space M by way of corresponding inlets/connectors 281 to 284, and in each case having at least one outlet 485, via which the liquid F can additionally be delivered in a controllable manner to the at least one tube bundle 20. For this purpose, the said lines 481 to 484 in each case have an assigned valve 181 to 184, which is controllable by means of the control means 120, so that the control means 120 can set the individual valves 181 to 184 in a way corresponding to the momentary actual temperature distribution such that the additional flow S' of the liquid F is distributed over the tube bundle 20 in such a way that the continuously measured actual temperature distribution is made to approximate the predetermined target temperature distribution. In order to be able to deliver the liquid F to the tube bundle 20 in a controlled manner by way of the lines 481 to 484, the lines 481 to 484 are led through the said through-regions 45 of the main distributor 44, the outlets 485 of the lines 481 to 484 being arranged above the tube bundle 20, to be precise in particular such that the liquid F can be applied in a controllable manner to the tube bundle 20 separately section by section in the radial direction R of the shell 80 or of the tube bundle 20. The individual sections may in each case reach around radially further inwardly located sections, neighbouring sections also being able to pass through one another.

Figure 2:
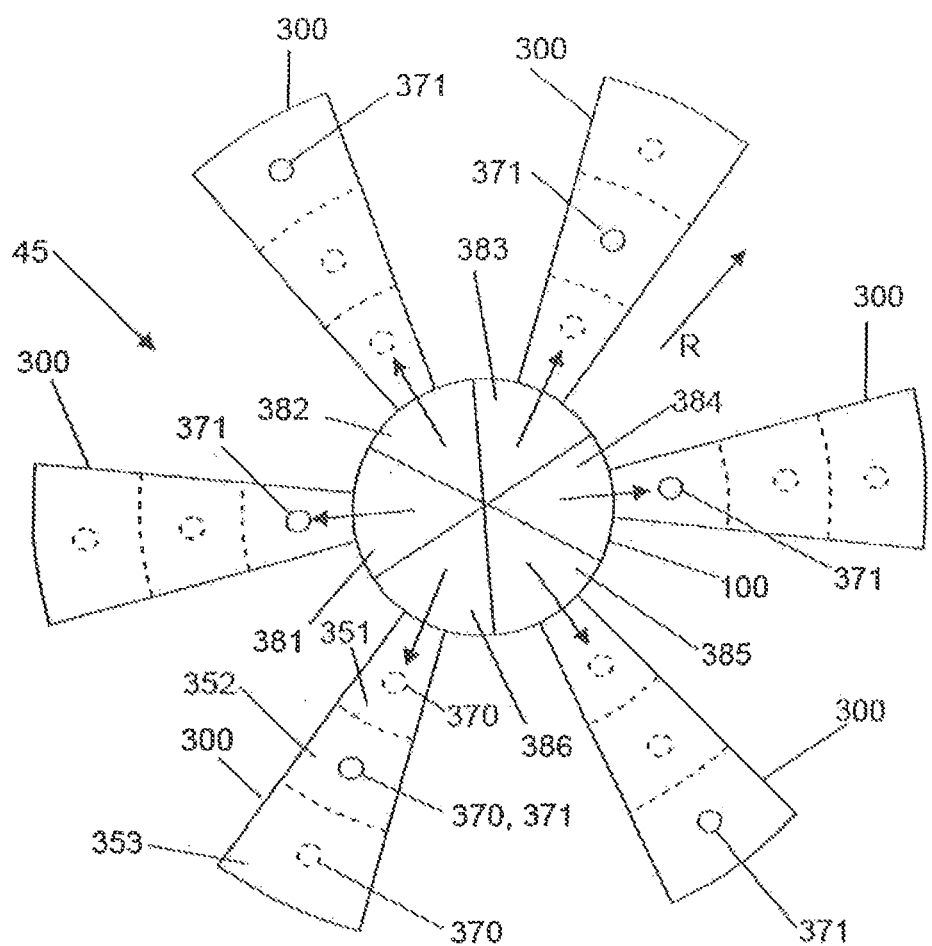
FIG. 2 shows a plan view of a liquid distributor for shell-side control in dependence on a measured actual temperature distribution.

Apart from the shell-side control of an additional flow S', there is also the possibility of controlling the main flow S by way of the liquid distributor 40 itself. This is shown in FIG. 2. Here, for variably distributing the flow S of the liquid F in the radial direction R, the distributor arms 300, which are formed as sectors of a circle, of the main distributor 44 of the type shown in FIG. 1, which are separated from one another by the said through-regions 45, may be divided into a plurality of segments 351 to 353, which each have at least one through-opening 370, through which the liquid F can rain down onto the tube bundle 20 located below. If a feed of liquid F into the said segments 351 to 353 is then controlled separately for each of the segments 351 to 353, for example by each segment 351 to 353 being charged by way of a downpipe that can be controlled by means of a valve (for example from a pre-distributor 43), the flow S of the liquid F can be distributed variably in the radial direction R of the shell 80 or of the tube bundle 20 over a number of sections of the tube bundle 20 corresponding to the number of segments (see above). For this purpose, the said control means 120 is correspondingly connected to the said valves at the downpipe, so that they can be controlled in a way corresponding to the momentary actual temperature distribution, measured in particular in real time, in such a way that the actual temperature distribution is made to approximate the target temperature distribution.

As an alternative to this, the distributor arms 300 may be designed for applying liquid F to different sections of the tube bundle 20, for example by corresponding distribution of the through-holes 371 of the distributor arms 300 along the radial direction R according to FIG. 2. In order to illustrate this, the distributor arms 300 according to FIG. 2 each have a through-opening 371, which is displaced in the radial direction R with respect to the corresponding through-openings 371 of the neighbouring distributor arms 300. Other such distributions, in particular with a number of through-holes per distributor arm 300, are likewise conceivable.

In order to be able to charge the individual distributor arms 300 with liquid F of the (main) flow S, it is preferably provided that the core tube 100 is divided into sections 381 to 386, so as to form a corresponding number of downpipes, which are in each case preferably configured in a controllable manner (for example by means of valves) and in each case charge at least one assigned distributor arm 300 with the liquid F (cf. FIG. 2). It is also conceivable that a section 381 to 386 of the core tube 100 applies the liquid F to more than one distributor arm 300, for example two distributor arms 300. The said downpipes 381 to 386 may once again be fed for example from a pre-distributor 43 according to FIG. 1. The said valves are once again connected to the control means 120, so that, in dependence on the respective actual temperature distribution, the individual valves can be set in such a way that the continuously measured actual temperature distribution is made to approximate the predetermined target temperature distribution of the tube bundle 20.

As an alternative or in addition to the aforementioned shell-side control of media flows S or S', there is also the possibility according to FIG. 1 of corresponding, sectional division or control of the tube flows. For this purpose, the tubes 20a of the tube bundle 20, arranged coaxially in relation to the shell 80 of the heat exchanger 2, are preferably coiled around the core tube 100 in such a way as to form a number of sections R1, R2, R3 of the tube bundle 20, which are formed separately from one another and respectively run around the core tube 100, it being possible that the sections R1, R2, R3 reach around one another, or else pass through one another. Consequently, there are radially staggered sections R1, R2, R3 of the tube bundle 20, which can be rained on with the liquid F in a separately controllable manner in the way described above. In addition, the individual sections R1, R2, R3 may not only be charged with the first medium separately via assigned inlets 51 to 56 at a lower end of the shell 80 (in the present case, each section R1, R2, R3 has two inlets and outlets without this restricting the overall generality; there may, however, also be only one inlet and outlet provided per section), but also application of media on the tube side may also be controlled by way of valves 71 to 76 that are assigned to the inlets 51 to 56 and are correspondingly connected to the control means 120. Here, the individual valves 71 to 76 are set by the control means 120 in such a way that the respective actual temperature distribution of the tube bundle 20 is made to approximate a desired target temperature distribution. The medium F' introduced into the individual radial sections R1. R2, R3 may finally be drawn off from the tube bundle 20 at an upper end of the shell 80 via corresponding outlets 61 to 66 of the sections R1, R2, R3.

The tube-side control described above may of course also be used in the case of straight tube heat exchangers with linearly running tubes.

Figure 3:
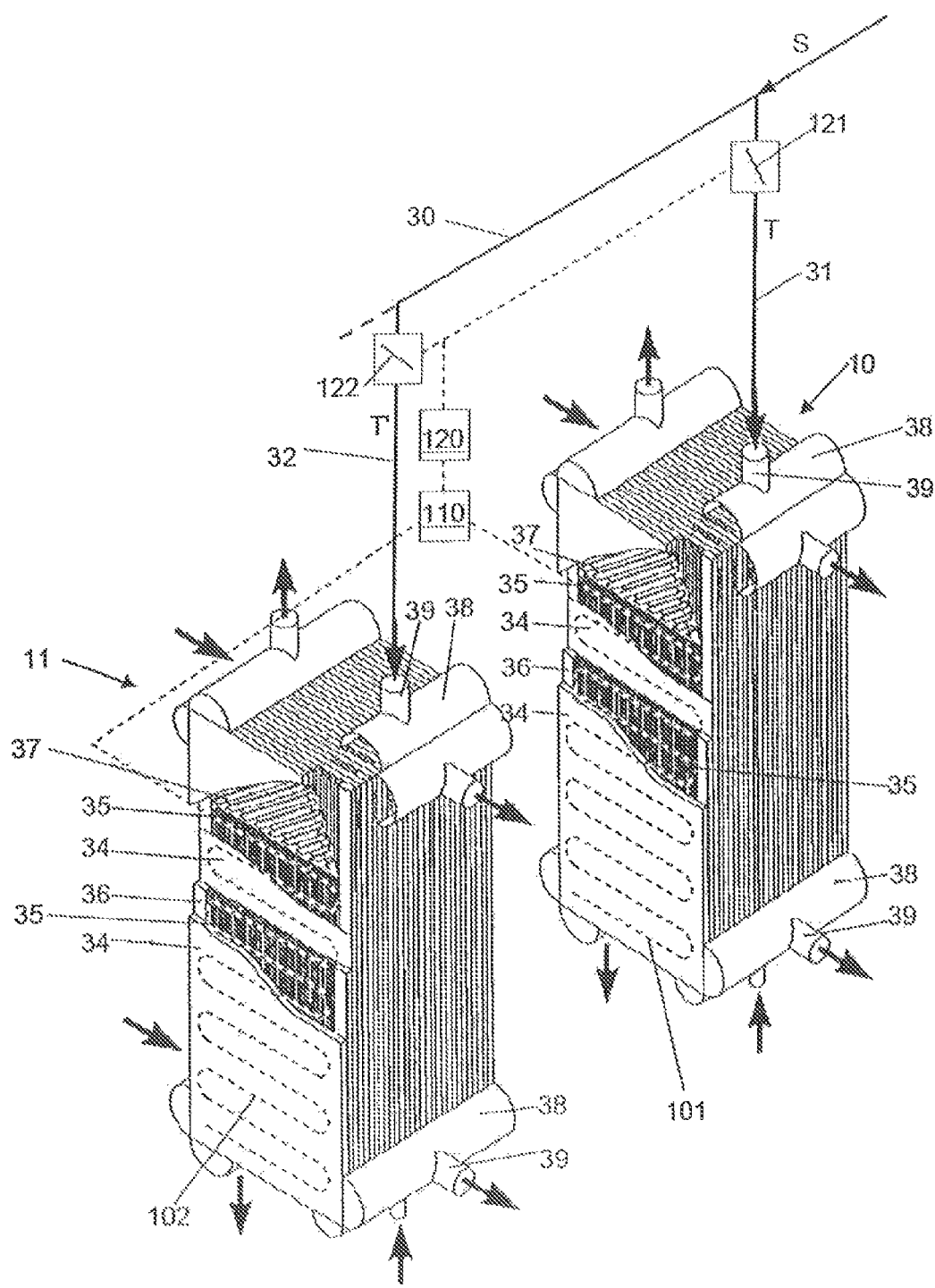
FIG. 3 shows a heat exchanger in the form of a battery of plate heat exchangers, a flow introduced into the individual plate heat exchangers being controlled by means of trimming plates in dependence on a measured actual temperature distribution of the battery of plate heat exchangers.

FIG. 3 shows a further example for controlling a temperature distribution in a heat exchanger 1, which in the present case is a battery of plate heat exchangers, which is made up of a number of plate heat exchangers 10, 11 that are operated parallel to one another. Such plate heat exchangers 10, 11 have a number of fins 35, which in each case extend along a vertical plane of extent and are in each case arranged between two plates 34 of the respective plate heat exchanger 10, 11 that are made to extend along that plane of extent. To the sides, the fins 35 are bounded by sidebars (also referred to as edge strips) 36, which are brazed to the respectively neighbouring plates 34. In this way, the plate heat exchangers 10, 11 respectively form a multiplicity of parallel heat exchanging passages, in which process media can flow and can indirectly transfer heat to process media carried in neighbouring heat exchanging passages. The individual heat exchanging passages may each be charged via connectors 39 and headers 38 with a partial flow T, T' of a flow S to be controlled, these branching off from a main line. This can of course be performed for all the process flows that are to be introduced into the respective plate heat exchanger 10, 11. The individual partial flows T, T' may be adjusted by means of trimming flaps 121, 122, in order to have an influence on the respective actual temperature distribution in the individual plate heat exchangers 10, 11. The trimming flaps 121, 122 are in this case respectively arranged in a feed line 31, 32, by way of which the respective partial flow T, T' is conducted to the assigned plate heat exchanger 10, 11, in such a way that the partial flow T, T' conducted by way of the respective trimming flap 121, 122 can be set (e.g. can be restricted) by corresponding pivoting or rotating of the trimming flaps 121, 122 in the respective feed line 31, 32.

The said actual temperature distribution is measured for each plate heat exchanger 10, 11 by in each case at least one optical waveguide 101, 102, which is preferably arranged in a heat exchanging passage of the respective plate heat exchanger 10, 11 that preferably does not participate in a heat exchanging process (known as a dummy layer, which is not flowed through by a process medium). Such optical waveguides 101, 102 may of course be laid in a meandering form in a number of parallel heat exchanging passages or dummy layers, so that altogether the respective plate heat exchanger 10, 11 can be measured three-dimensionally, i.e. by means of the optical waveguides 101, 102 a three-dimensional temperature distribution can be indicated for the respective plate heat exchanger 10, 11. Here, the said optical waveguides 101, 102 are connected in the way described above to a measuring device 110, which once again is connected to a control means 120, which adjusts the said partial flows T, T' by way of the assigned trimming flaps 121, 122 in order to make the actual temperature distributions of the individual plate heat exchangers 10, 11 approximate a desired target temperature distribution. In the present case, the plate heat exchangers 10, 11 have separate headers 38. It is also conceivable in the case of a battery of plate heat exchangers comprising plate heat exchangers 10, 11 that have common headers 38 to perform the control by means of trimming flaps or similar devices which are provided in the respective header, so that the individual plate heat exchangers or plate heat exchanger modules 10, 11 can be adjusted separately.

By means of the optical waveguides 101, 102, it is therefore possible in particular to measure the temperatures or the actual temperature distribution of the entire respective plate heat exchanger 10, 11. With the actual temperature distributions of all the plate heat exchangers 10, 11 in such a battery, the overheating zones of each plate heat exchanger 10, 11 can be measured exactly. By means of the trimming flaps 121, 122, it is advantageously possible here to adjust each individual plate heat exchanger 10, 11 on the basis of the greatest heat flow S of the plate heat exchangers 10, 11. In this way it is possible to avoid pinch points, to eliminate unequal loading and to use the heating surface of the plate heat exchangers 10, 11 optimally. If the temperature distributions in the individual plate heat exchangers change due to load changes, this can be detected by the measured actual temperature profile and correspondingly adjusted.

LIST OF DESIGNATIONS

1 Device
10, 11 Plate heat exchanger
20 Tube bundle
20a Tube
R1, R2, R3 Sections
30 Main line
31, 32 Feed line
33 Heat exchanger
34 Plate (top plate)
35 Fin
36 Sidebar
37 Distributor fin
38 Header
39 Connector
40 Liquid distributor
43 Pre-distributor
44 Main distributor
45 Through-region
51, 52, 53, 54, 55, 56 Inlet
61, 62, 63, 64, 65, 66 Outlet
71, 72, 73, 74, 75, 76 Valves
80 Shell
100 Core tube
101, 102 Optical waveguide
110 Measuring device
120 Control means
121, 122 Trimming flaps
181, 182, 183, 184 Valves
281, 282, 283, 284 Inlet
300 Distributor arm
351, 352, 353 Segment
370, 371 Through-opening
380 Downpipe
381-386 Section of downpipe

The invention claimed is:

1. Device comprising:
   a heat exchanger,
   at least one optical waveguide arranged in the heat exchanger for measuring an actual temperature distribution in the heat exchanger, and
   a measuring device connected to the at least one optical waveguide, which device is designed for launching light into the at least one optical waveguide and evaluating light scattered in the at least one optical waveguide for determining the actual temperature distribution, and
   the device having a control means for controlling at least one flow of a fluid medium carried in the heat exchanger in such a way that the actual temperature distribution is made to approximate a target temperature distribution;
   characterized in that the heat exchanger has a tube bundle with a multiplicity of tubes, which are arranged in a shell space of the heat exchanger, the at least one optical waveguide being arranged in the interior space of a tube of the heat exchanger in the shell space.

2. Device according to claim 1, characterized in that the tubes form a plurality of sections of the tube bundle that are separately chargeable with that medium, the individual sections in each case being charged with a flow of the medium in such a way that the actual temperature distribution is made to approximate the target temperature distribution.

3. Device according to claim 1, characterized in that, the heat exchanger is in the form of a helically coiled heat exchanger, the device is designed for distributing a flow of a liquid medium in the shell space over the tube bundle in such a way that the actual temperature distribution is made to approximate the target temperature distribution, the device being designed for distributing the liquid medium variably over the tube bundle in a radial direction of the tube bundle so that the actual temperature distribution is made to approximate the target temperature distribution.

4. Device according to claim 1, characterized in that the heat exchanger is formed by a plurality of plate heat exchangers interconnected in parallel, that actual temperature distribution comprising actual temperature distributions of the individual plate heat exchangers.

5. Device according to claim 4, characterized in that the device is designed for dividing the at least one flow of the fluid medium upstream of the heat exchanger into a number of partial flows, and introducing them in each case into an assigned plate heat exchanger, the device being designed for controlling the individual partial flows in such a way that the actual temperature distribution is made to approximate the target temperature distribution.

6. Device according to claim 1, characterized in that the actual temperature distribution is a three-dimensional actual temperature distribution.

7. Device according to claim 1, characterized in that the optical waveguide is a glass fibre.

8. Device comprising:
heat exchanger,
at least one optical waveguide arranged in the heat exchanger for measuring an actual temperature distribution in the heat exchanger, and
a measuring device connected to the at least one optical waveguide, which device is designed for launching light into the at least one optical waveguide and evaluating light scattered in the at least one optical waveguide for determining the actual temperature distribution, and
the device having a control means for controlling at least one flow of a fluid medium carried in the heat exchanger in such a way that the actual temperature distribution is made to approximate a target temperature distribution;
characterized in that the heat exchanger has a tube bundle with a multiplicity of tubes, which are arranged in a shell space of the heat exchanger, the at least one optical waveguide being arranged in the interior space of a tube of the heat exchanger in the shell space.

9. Device according to claim 1, characterized in that the heat exchanger is a helically coiled heat exchanger.

10. Device according to claim 1, characterized in that the heat exchanger is a straight tube heat exchanger.

11. Device according to claim 1, characterized in that, the heat exchanger is in the form of a helically coiled heat exchanger, in the shell space a flow of a liquid medium is distributed over the tube bundle in such a way that the actual temperature distribution is made to approximate the target temperature distribution, the liquid medium being distributed in a circumferential direction of the tube bundle, so that the actual temperature distribution is made to approximate the target temperature distribution.

12. Device according to claim 5, characterized in that, the fluid medium is a coolant.

* * * * *